Patented July 21, 1925.

1,546,946

UNITED STATES PATENT OFFICE.

GRAY SINGLETON, OF FORT MEADE, FLORIDA.

TREATMENT OF PHOSPHATE ROCK.

No Drawing. Application filed February 19, 1923. Serial No. 620,070.

*To all whom it may concern:*

Be it known that I, GRAY SINGLETON, a citizen of the United States, and a resident of Fort Meade, in the county of Polk and State of Florida, have invented a new and useful Treatment of Phosphate Rock, of which the following is a specification.

The wet rock, after being washed to separate it from the matrix in which it occurs, is fed into a rotary kiln such as is commonly used in the Florida pebble district. A kiln such as I prefer to employ is provided with flights and is lined with firebrick at the fire end, but the design of the kiln is not essential to the process. The process is so conducted that as the material passes through such a kiln, the surface moisture is first evaporated, and in the fire end of the kiln destructive distillation or elimination of the organic material contained in the rock takes place, changing the color of the rock from light gray to very dark, almost black. I regulate the heating, however, so that the carbon dioxide of the calcium carbonate also contained in the rock is not driven off, it being an essential part of my invention that the carbonate be preserved, and consequently the heating is below the point at which this would occur. The precise temperature will naturally depend upon the condition of the rock and the speed at which it is passed through the kiln. I find that when the material is fed into the kiln at the rate of twelve tons per hour and caused to traverse the entire kiln in three minutes, the temperature at the fire end should not be allowed to exceed one thousand degrees centigrade. The proper temperature for any particular case is readily ascertainable. If a higher heat is used the carbon dioxide is driven off making the rock unfit for the manufacture of acid phosphate.

It has been found that phosphate rock treated in the above manner requires about eight per cent less sulphuric acid in the manufacture of acid phosphate, and on a large number of samples the average increase in grade was found to be three and one-half per cent bone phosphate of lime.

What I claim as new is:

The herein described method of treating phosphate rock containing carbonate which consists in subjecting the phosphate rock material to heat sufficient to eliminate organic matter contained in the rock and regulating the heating so that the carbon dioxide is retained.

GRAY SINGLETON.